US012493262B2

(12) United States Patent
Terakawa

(10) Patent No.: US 12,493,262 B2
(45) Date of Patent: Dec. 9, 2025

(54) IMAGE FORMING APPARATUS, IMAGE FORMING SYSTEM, AND EXTERNAL UNIT

(71) Applicant: CANON KABUSHIKI KAISHA, Tokyo (JP)

(72) Inventor: Shogo Terakawa, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/889,618

(22) Filed: Sep. 19, 2024

(65) Prior Publication Data

US 2025/0110442 A1 Apr. 3, 2025

(30) Foreign Application Priority Data

Oct. 3, 2023 (JP) ................................ 2023-172272

(51) Int. Cl.
*G03G 15/00* (2006.01)
*G03G 21/16* (2006.01)

(52) U.S. Cl.
CPC ..... *G03G 21/1638* (2013.01); *G03G 15/6502* (2013.01); *G03G 15/80* (2013.01); *G03G 21/1652* (2013.01); *G03G 21/1695* (2013.01); *G03G 2221/166* (2013.01)

(58) Field of Classification Search
CPC ............... G03G 15/80; G03G 15/6052; G03G 21/1638; G03G 21/1652; G03G 21/1695
USPC .................................................. 399/107, 110
See application file for complete search history.

(56) References Cited

U.S. PATENT DOCUMENTS

| | | | | |
|---|---|---|---|---|
| 6,308,026 | B1 * | 10/2001 | Kouchi | G03G 15/00 399/92 |
| 8,731,433 | B2 * | 5/2014 | Kondo | G03G 21/1619 399/107 |
| 9,207,620 | B2 * | 12/2015 | Okumura | G03G 21/1652 |
| 9,372,469 | B1 * | 6/2016 | Kawamata | G03G 21/1642 |
| 11,429,056 | B2 * | 8/2022 | Ambe | G03G 21/1619 |
| 2015/0098722 | A1 | 4/2015 | Okauchi | |

FOREIGN PATENT DOCUMENTS

| | | | |
|---|---|---|---|
| JP | 2003207962 | A | 7/2003 |
| JP | 2008262010 | A | 10/2008 |
| JP | 2009222887 | A | 10/2009 |
| JP | 2015075611 | A | 4/2015 |

* cited by examiner

*Primary Examiner* — Hoan H Tran
(74) *Attorney, Agent, or Firm* — ROSSI, KIMMS & McDOWELL LLP

(57) ABSTRACT

An image forming apparatus includes a casing, a connector, and a cover member. The casing including a first and second outer wall portions. The connector is provided inside of the casing and electrically connectable with the external unit. The cover member is attachable to and detachable from the casing. The first outer wall portion includes a first opening configured to expose a connection terminal of the connector. The second outer wall portion includes a second opening configured to expose a component provided inside of the casing. The cover member includes a first cover portion covering the first opening in a state where the cover member is attached to the casing, and a second cover portion formed integrally with the first cover portion and configured to cover the second opening when the cover member is attached to the casing.

18 Claims, 12 Drawing Sheets

IMAGE FORMING APPARATUS, IMAGE FORMING SYSTEM, AND EXTERNAL UNIT

BACKGROUND OF THE INVENTION

Field of the Invention

This disclosure relates to an image forming apparatus including a connector that electrically connects a removable external unit, an image forming system that includes the image forming apparatus and the external unit, and the external unit.

Description of the Related Art

Hitherto, image forming systems in which external units are mounted to image forming apparatuses as a retrofit optional apparatus are proposed. The external units include, for example, such as sheet storage apparatuses that supply various sizes and types of sheets to the image forming apparatuses. The image forming apparatuses and the external units are not only mechanically interconnected but also electrically connected via connectors (Japanese Patent Laid-Open No. 2015-75611).

In a case of an apparatus described in Japanese Patent Laid-Open No. 2015-75611, an opening portion is closed by a connector cover to prevent the exposure of a connector (referred to as a body side connector) disposed in the image forming apparatus. The opening portion is opened in response to a slide movement of the connector cover, and the apparatus body side connector is exposed from the opening portion to allow engagement with a connector (referred to as a unit side connector) disposed in the external unit. Therefore, at a time of mounting the external unit, a worker is required to slide the connector cover to open the opening portion. In addition, it is configured such that the worker can mount the external unit to the image forming apparatus while confirming positions of the apparatus body side connector and the unit side connector through a window (opening portion) formed in an exterior cover of the image forming apparatus. A detachable window cover is attached to this window. Therefore, the worker detaches the window cover at a time of mounting the external unit, and attaches the window cover after mounting the external unit.

As described above, in the case of the apparatus described in Japanese Patent Laid-Open No. 2015-75611, two cover members of the connector cover and the window cover are disposed. Therefore, when mounting and removing the external unit with respect to the image forming apparatus, since the worker is required to perform work to attach and detach the connector cover and the window cover, the mounting and removing of the external unit take time.

This disclosure is made in view of the aforementioned problems, and aims to provide an image forming apparatus, an image forming system that includes the image forming apparatus and an external unit, and the external unit that are configured to improve the workability of the worker for mounting and removing the external unit.

SUMMARY OF THE INVENTION

According to a first aspect of the present invention, an image forming apparatus is configured to form an image on a recording material and configured to be connectable with an external unit. The image forming apparatus includes a casing including a first outer wall portion configured to form at least part of a first exterior surface facing an installation surface on which the image forming apparatus is installed, and a second outer wall portion configured to form at least part of a second exterior surface intersecting with the first exterior surface, the external unit being connectable at a position between the first exterior surface and the installation surface, a connector provided inside of the casing and configured to be electrically connectable with the external unit, and a cover member attachable to and detachable from the casing. The first outer wall portion includes a first opening configured to expose a connection terminal of the connector. The second outer wall portion includes a second opening configured to expose a component provided inside of the casing. The cover member includes a first cover portion configured to cover the first opening in a state where the cover member is attached to the casing, and a second cover portion formed integrally with the first cover portion and configured to cover the second opening in the state where the cover member is attached to the casing.

According to a second aspect of the present invention, an image forming system includes an image forming apparatus configured to form an image on a recording material, and an external unit connected to the image forming apparatus. The image forming apparatus includes a first casing including a first outer wall portion configured to form at least a part of a facing surface facing the external unit, and a second outer wall portion configured to form at least a first part of an exterior surface intersecting with the facing surface, the external unit being provided at a position between the first exterior surface and an installation surface where the image forming system is installed, and a body side connector provided inside of the first casing. The external unit includes a second casing including a unit side outer wall portion configured to form a second part of the exterior surface, the second part being different from the first part, and a unit side connector electrically connected with the body side connector. An external-unit-side edge of the second outer wall portion includes a concave portion where the edge of the second outer wall portion is recessed toward the image forming apparatus from the external unit. An image-forming-apparatus-side edge of the unit side outer wall portion includes a projection portion where the edge of the unit side outer wall portion projects toward the image forming apparatus from the external unit, the projection portion engaging with the concave portion. When viewed in a direction perpendicular to the second outer wall portion, the projection portion overlaps at least partially with the body side connector.

According to a third aspect of the present invention, an image forming system includes an image forming apparatus configured to form an image on a recording material, and an external unit connected to the image forming apparatus. The image forming apparatus includes a first casing that includes a first outer wall portion configured to form at least a part of a first exterior surface facing the external unit, and a second outer wall portion configured to form at least a first part of a second exterior surface intersecting with the first exterior surface, the external unit being provided at a position between the first exterior surface and an installation surface where the image forming system is installed, a body side connector provided inside of the first casing, and a cover member configured detachably attached to the first casing. The first outer wall portion includes a first opening configured to expose a connection terminal of the body side connector. The second outer wall portion includes a second opening configured to expose a component provided inside of the first casing. The cover member includes a first cover portion configured to cover the first opening in a state where the cover member is attached to the first casing, and a second cover portion formed integrally with the first cover portion and configured to cover the second opening in the state where the cover member is attached to the first casing. The external unit includes a second casing including a unit side outer wall portion configured to form a second part of the second exterior surface, the second part being different from the first part, and a unit side connector electrically connected with the body side connector. The first cover portion includes a fixed portion fixed to the second cover portion, a moving portion configured to slide with respect to the fixed portion, and an urging member configured to urge the moving portion with respect to the second cover portion in an attachment direction intersecting with the second outer wall portion. In a case where the cover member is attached to the first casing, the moving portion is configured to open the first opening while resisting an urging force of the urging member.

According to a fourth aspect of the present invention, an external unit is configured to be connected on an outer wall portion of a casing included in an image forming apparatus which forms an image on a recording material. The external unit includes a unit side casing including a unit side outer wall portion configured to form at least a part of an exterior surface intersecting with a facing surface to face the outer wall portion of the casing of the image forming apparatus, and a unit side connector projecting toward a side of the image forming apparatus further than the facing surface and configured to be electrically connected with the image forming apparatus. The unit side outer wall portion includes a protruding portion formed by a part of an image-forming-apparatus-side edge of the unit side outer wall portion projecting toward the image forming apparatus from other part of the image-forming-apparatus-side edge. The protruding portion overlaps with the unit side connector when viewed from an outside of the unit side outer wall portion in a direction perpendicular to a projecting direction of the unit side connector.

Further features of the present invention will become apparent from the following description of exemplary embodiments with reference to the attached drawings.

DESCRIPTION OF THE EMBODIMENTS

Image Forming Apparatus

Figure 1:
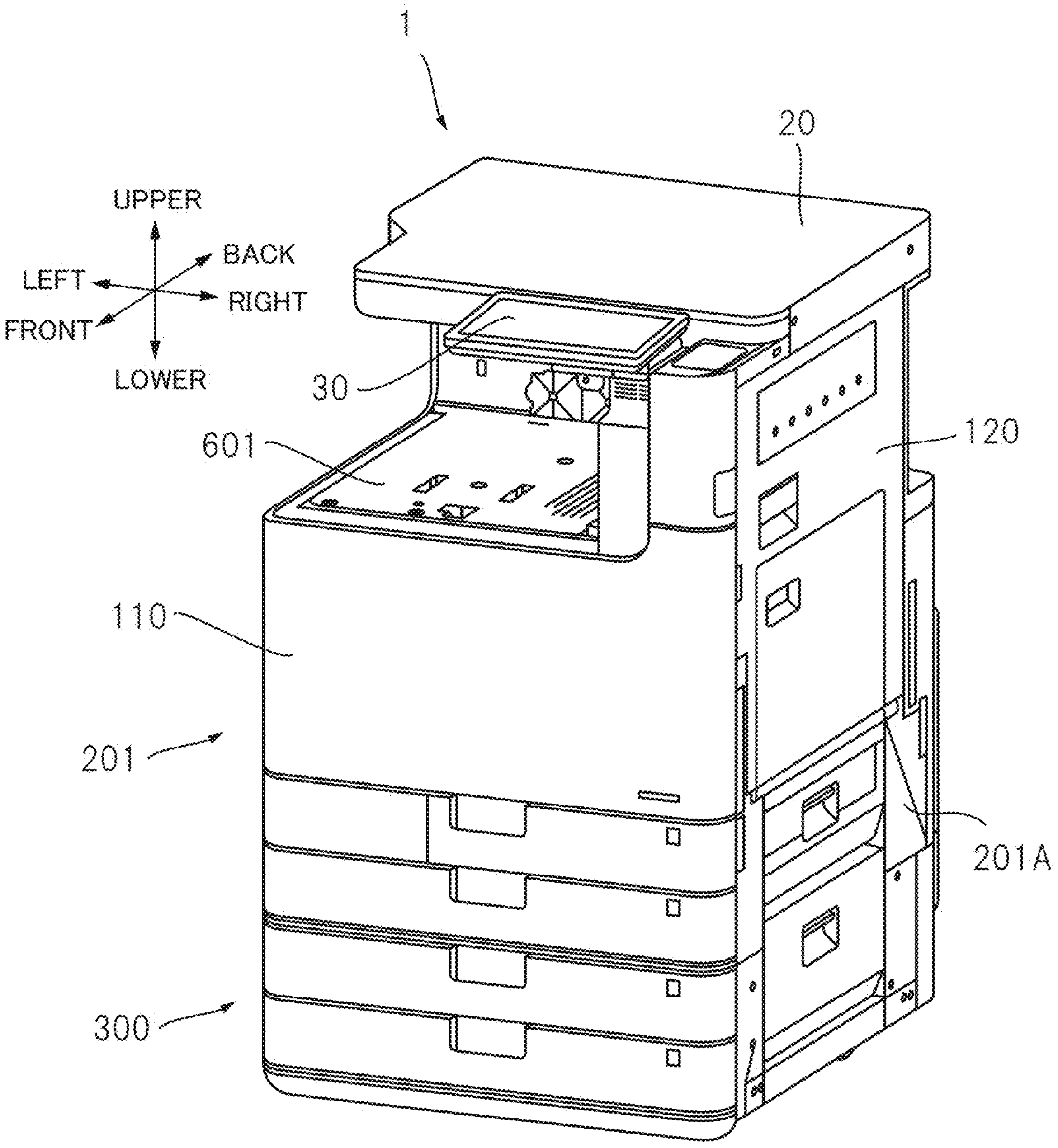
FIG. 1 is a perspective view illustrating an image forming system of this embodiment when viewed from the front side.
Figure 2:
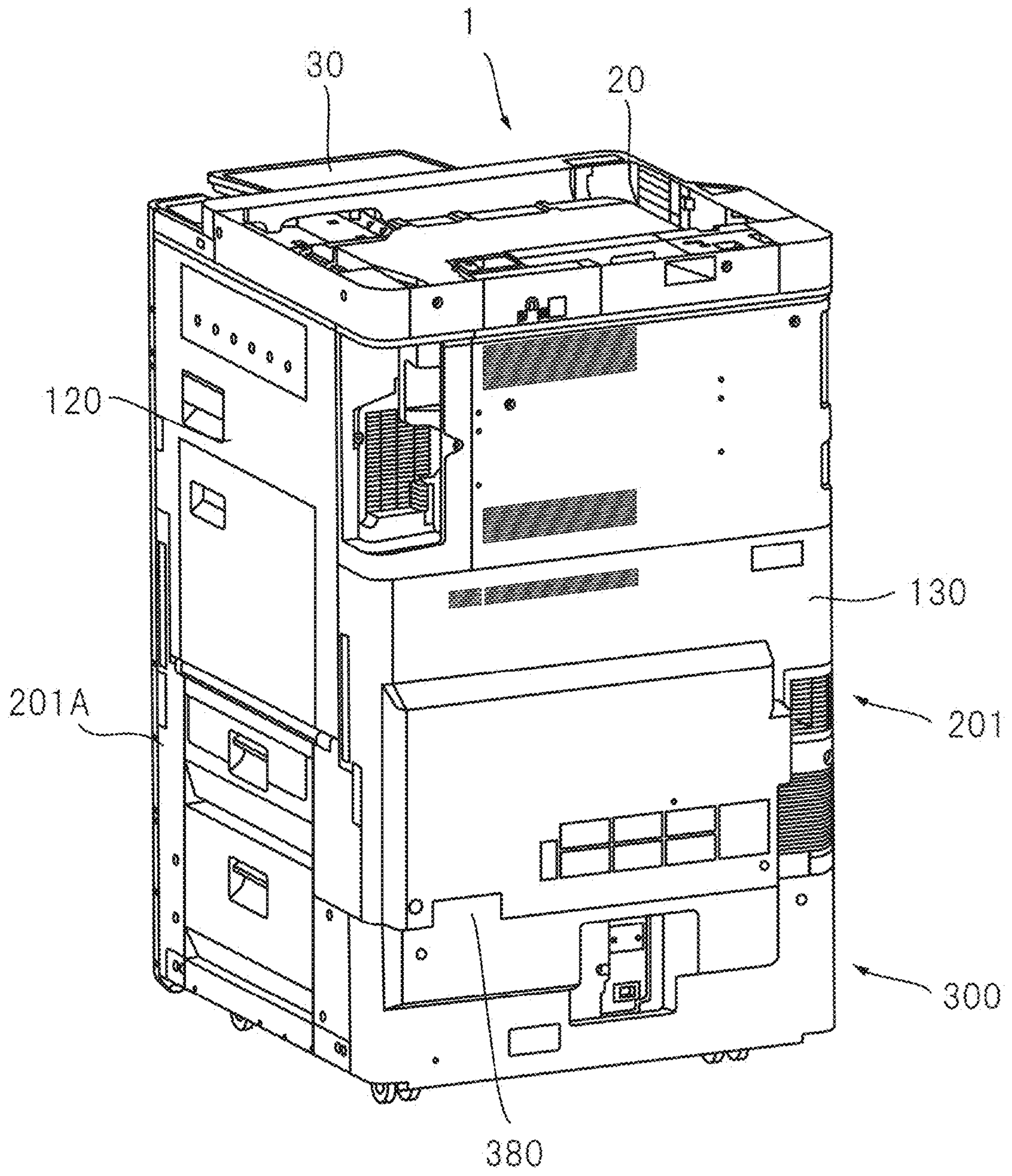
FIG. 2 is a perspective view illustrating the image forming system when viewed from the back side.
Figure 3:
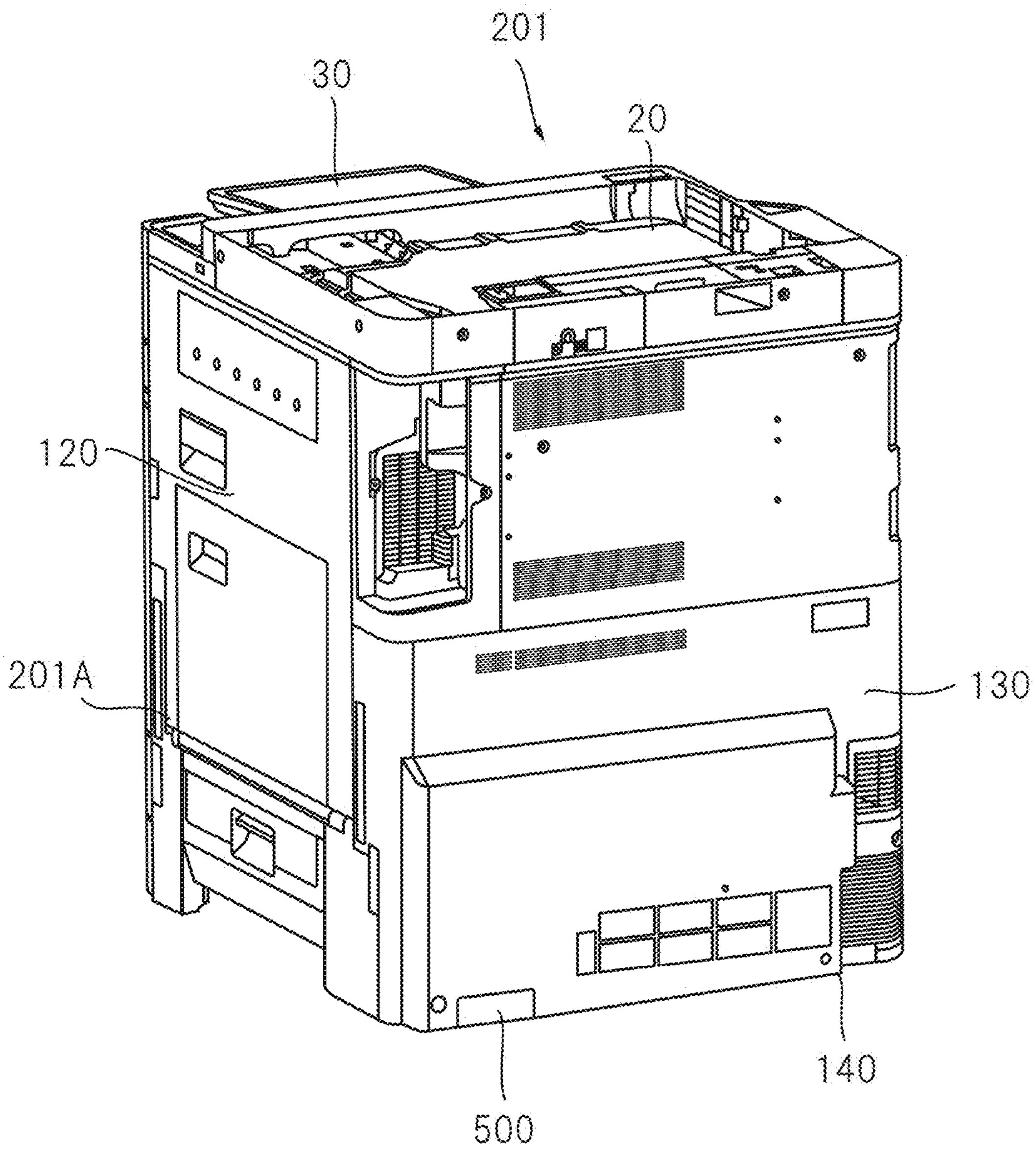
FIG. 3 is a perspective view illustrating an image forming apparatus when viewed from the back side.

Hereinafter, this embodiment will be described. First, using FIGS. 1 to 3, overviews of an image forming system and an image forming apparatus of this embodiment will be described. FIG. 1 is a perspective view illustrating the image forming system when viewed from the front side. FIG. 2 is a perspective view illustrating the image forming system when viewed from the back side. FIG. 3 is a perspective view illustrating the image forming apparatus when viewed from the back side.

As illustrated in FIGS. 1 and 2, the image forming system 1 of this embodiment includes the image forming apparatus 201 and a sheet storage apparatus 300 disposed under the image forming apparatus 201. The sheet storage apparatus 300 is an example of an external unit, and is retrofitted and detachably disposed to the image forming apparatus 201 as an optional apparatus. The sheet storage apparatus 300 can store various sizes and types of sheets inside, and supplies those sheets to the image forming apparatus 201. That is, the image forming apparatus 201 is configured to be connectable with the sheet storage apparatus 300.

The image forming apparatus 201 of this embodiment is a so-called in-drum discharge type image forming apparatus. The image forming apparatus 201 includes a casing 201A and a document reading apparatus 20 reading image information of a document, and a sheet discharge tray 601 is formed between the casing 201A and the document reading apparatus 20 for supporting the sheet discharged from the casing 201A. An operation unit 30 including such as a display unit capable of displaying various information and a key capable of inputting various information based on a user operation is arranged on the front side of the casing 201A, serving as a first casing.

To be noted, in this specification, a side on which a worker stands to operate the image forming apparatus 201 is referred to as the "front side" (or front), and the opposite side is referred to as the "back side" (or back). In addition, the left side when viewing the image forming apparatus 201 from the front side is referred to as "left", and the right side when viewing the image forming apparatus 201 from the front side is referred to as "right".

The casing 201A includes a plurality of sheet metal members such as a front-side plate disposed on the front side of the image forming apparatus 201, a back-side plate disposed on the back side and supporting various units with the front-side plate, a stay connecting these front-side and back-side plates, a supporting column supporting the front-side plate, and a bottom portion, and exterior covers forming an exterior of the image forming apparatus 201. As the exterior covers, a front cover 110 is arranged on the front side, side covers 120 on both sides on the left and right, and a back cover 130 on the back side. As illustrated in FIG. 3, the back cover 130 of this embodiment is arranged in a direction intersecting with a bottom portion 140, and is arranged to be continuous with an edge portion of the bottom portion 140. The back cover 130 forms a part of the exterior surface on the back side. To be noted, the exterior surface does not necessarily have to be a single plane, and may include steps as illustrated in FIG. 3. The bottom portion 140 forms a part of the exterior surface on a bottom side. The exterior surfaces on the bottom side and the back side are in a relationship of intersecting with each other. In addition, in a case of connecting (or mounting) an external unit (for example, sheet storage apparatus 300) to the image forming apparatus 201, a surface formed by the bottom portion 140 becomes a facing surface facing such an external unit. In this embodiment, in a case where the sheet storage apparatus 300 is not mounted to the image forming apparatus 201, as described in detail below, a detachable cover 500 is attached to the casing 201A to cover an opening window portion 131 (refer to FIG. 5 described below). Here, as an example, the detachable cover 500 is detachably disposed at a position on the right of the back side of the image forming apparatus 201.

Figure 4:
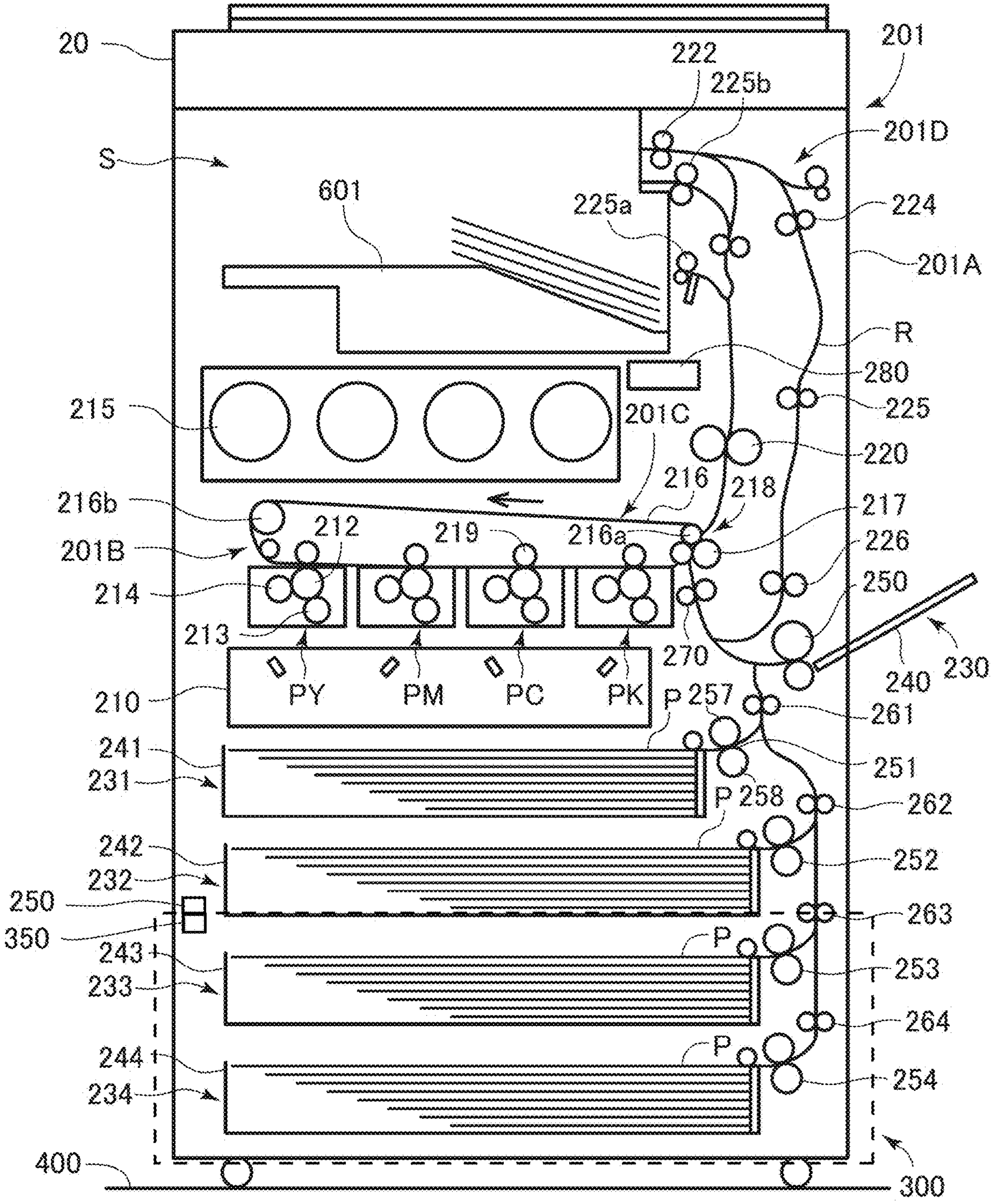
FIG. 4 is a schematic diagram illustrating a configuration of the image forming system.

Next, using FIG. 4, a schematic configuration of the image forming apparatus 201 will be described. In FIG. 4, the image forming apparatus 201 with the sheet storage apparatus 300 mounted is illustrated. As illustrated in FIG. 4, the image forming apparatus 201 includes an image forming unit 201B forming a toner image on a sheet P. The image forming unit 201B is an electrophotographic unit of an intermediate transfer method.

The image forming unit 201B includes a laser scanner 210 and four process cartridges PY, PM, PC, and PK that form the toner images of four colors: yellow (Y), magenta (M), cyan (C), and black (K). Each of the process cartridges PY to PK is an image forming unit including a photosensitive drum 212, a charge unit 213, and a developing unit 214. In addition, the image forming unit 201B includes an intermediate transfer unit 201C arranged above the process cartridges PY to PK, and a fixing unit 220. Toner cartridges 215 for supplying toner to each development unit 214 are mounted above the intermediate transfer unit 201C.

The intermediate transfer unit 201C includes an intermediate transfer belt 216 wound around a drive roller 216*a* and a tension roller 216*b*. Primary transfer rollers 219 that come into contact with the intermediate transfer belt 216 at positions facing each of the photosensitive drums 212 are disposed on an inner side of the intermediate transfer belt 216. The intermediate transfer belt 216 is rotatably driven in a counter-clockwise direction by the drive roller 216*a* driven by a drive unit, not shown.

A secondary transfer roller 217 for transferring the toner image borne on the intermediate transfer belt 216 onto the sheet P is disposed at a position facing the drive roller 216*a* of the intermediate transfer unit 201C. The fixing unit 220 is disposed above the secondary transfer roller 217, and a first sheet discharge roller pair 225*a*, a second sheet discharge roller pair 225*b*, and a duplex reverse unit 201D are arranged above the fixing unit 220. In the duplex reverse unit 201D, a reverse roller pair 222 capable of rotating in forward and reverse directions, and a re-conveyance path R re-conveying the sheet, on whose first surface the image has been formed, to the image forming unit 201B are disposed.

An image forming operation of the image forming unit 201B will be described. The image of the document is read by the document reading apparatus 20, and, after image processing has been performed by a control unit, not shown, is transmitted to the laser scanner 210 of the image forming unit 201B by being converted into an electrical signal. In the image forming unit 201B, the photosensitive drum 212, whose surface has been uniformly charged to an electric potential of a predetermined polarity by the charge unit 213, is irradiated with a laser beam from the laser scanner 210, and the surface of the rotating photosensitive drum 212 is exposed. Thereby, an electrostatic latent image corresponding to each of the images of yellow, magenta, cyan, and black is formed on the surface of the photosensitive drum 212 of each of the process cartridges PY to PK. After being developed to be visualized by each color of the toners supplied from the developing units 214, these electrostatic latent images are primarily transferred from the photosensitive drums 212 onto the intermediate transfer belt 216 by a primary transfer voltage applied to the primary transfer rollers 219.

The image forming apparatus 201 includes a first sheet feed unit 231 and a second sheet feed unit 232. The first sheet feed unit 231 includes a first cassette 241 accommodating the sheet P, and a first feed roller pair 251 and a first extraction roller pair 261, which feed the sheet P stored in the first cassette 241. The second sheet feed unit 232 includes a second cassette 242 storing the sheet P, and a second feed roller pair 252 and a second extraction roller pair 262, which feed the sheet P stored in the second cassette 242.

In a case where the sheet storage apparatus 300 is mounted, the sheet P is fed from the sheet storage apparatus 300 to the image forming apparatus 201. The sheet storage apparatus 300, serving as an accommodating portion, includes a third sheet feed unit 233 and a fourth sheet feed unit 234. The third sheet feed unit 233 includes a third cassette 243 storing the sheet P, and a third feed roller pair 253 and a third extraction roller pair 263, which feed the sheet P stored in the third cassette 243. The fourth sheet feed unit 234 includes a fourth cassette 244 storing the sheet P, and a fourth feed roller pair 254 and a fourth extraction roller pair 264, which feed the sheet P stored in the fourth cassette 244.

The sheet storage apparatus 300 receives power supply from a power supply unit 280 provided in the image forming apparatus 201, and, by receiving a control electrical signal (hereinafter, referred to as a control signal) from the control unit provided in the image forming apparatus 201, performs a supply operation of the sheet P to the image forming apparatus 201. The power supply unit 280 of the image forming apparatus 201 is electrically connected to an external commercial power supply source via a commercial power outlet and power cord, not shown, and, in addition to supplying the power from the commercial power supply source to various parts of the image forming apparatus 201, is used to supply the power to the sheet storage apparatus 300.

Each of the cassettes 241 to 244 can be inserted and retracted with respect to the casing 201A. As the sheet P, paper such as regular paper and cardboard, a plastic film such as a sheet for an overhead projector, cloth, a surface treated sheet such as coated paper, and a recording material of a special shape such as an envelope and index paper can be used.

Each of the feed roller pairs 251 to 254 includes a feed roller 257 feeding the sheet P from the corresponding cassettes 241 to 244 and a retard roller 255 coming into contact with the feed roller 257. A driving force in a direction opposite to the rotation of the feed roller 257 is input to the retard roller 256 via, for example, a torque limiter. By applying a friction force to the sheet P that has entered a separation nip with the feed roller 257, the retard roller 258 separates the sheet P conveyed by the feed roller 257 from the other sheets. As described above, each of the feed roller pair 251 to 254 is configured to feed the sheet P of the cassettes 241 to 244 one sheet at a time.

The sheet P fed from each of the cassettes 241 to 244 by the feed roller pair 251 to 254 is conveyed toward a registration roller pair 270 via the extraction roller pairs 261 to 264, serving as conveyance roller pairs conveying the sheet P. At this time, the sheet P fed from the cassettes 242 to 244, excluding the uppermost cassette, are delivered to the extraction roller pairs 261 to 263 corresponding to the higher level cassettes, and is conveyed upward toward the registration roller pair 270. For example, the sheet P fed from the third sheet feed unit 233 included in the sheet storage apparatus 300 is fed from the third cassette 243 by the third feed roller pair 253, and is conveyed to the registration roller pair 270 via the third, second, and first extraction roller pairs 263, 262, and 261, in sequence.

In addition, in the image forming apparatus 201 of this embodiment, a manual sheet feed portion 230 on which a user can set the sheet P, if necessary, is disposed. The sheet P set on a manual feed tray 240 is conveyed to the registration roller pair 270 by a sheet feed roller pair 250 one sheet at a time.

After correcting the skew of the sheet P, the registration roller pair 270 sends the sheet P toward a secondary transfer portion 218 formed between the secondary transfer roller 217 and the intermediate transfer belt 216 based on timing for starting the formation of the toner image by the image forming unit 201B. By applying a secondary transfer voltage to the secondary transfer roller 217 at the secondary transfer portion 218, the toner image is transferred from the intermediate transfer belt 216 with respect to the sheet P. The sheet P onto which the toner image has been secondarily transferred is conveyed to the fixing unit 220, and the fixing unit 220 applies heat and pressure to the sheet P, so that the toner image is fixed on the sheet P.

Thereafter, the sheet P is supported on the sheet discharge tray 601 arranged on a bottom portion of a sheet discharge space S by the first or second sheet discharge roller pair 225*a* or 225*b* disposed downstream of the fixing unit 220 in a sheet conveyance direction. When forming the image on both sides of the sheet P, the sheet P on whose first surface the image has been formed is conveyed to the re-conveyance path R by the reverse roller pair 222. Then, when the sheet P has again reached the registration roller pair 270 by re-conveyance roller pairs 224, 225, and 226, the sheet P is conveyed to the image forming unit 201B by the registration roller pair 270. The sheet P on whose second surface opposite to the first surface the image has been formed is discharged to the sheet discharge tray 601 by the first or second sheet discharge roller pair 225*a* or 225*b*.

To be noted, the image forming unit 201B is not limited to the intermediate transfer method described above, and, for example, may be an image forming unit of a direct transfer method where the toner image formed on the photosensitive drum 212 is directly transferred onto the sheet P. In addition, it is not limited to such an electrophotographic method, and an image forming unit of an inkjet method or an offset printing method is acceptable.

Connector

As described above, the sheet storage apparatus 300 can operate by receiving the power from the power supply unit 280 of the image forming apparatus 201 and by receiving the control signal from the control unit, not shown, of the image forming apparatus 201. Therefore, the sheet storage apparatus 300 is connected to the image forming apparatus 201 not only mechanically but also electrically to receive the power supply and the control signal from the image forming apparatus 201. In this embodiment, it is configured such that, without the worker to use such as a connection cable, only by simply placing the image forming apparatus 201 on the sheet storage apparatus 300, the sheet storage apparatus 300 and the image forming apparatus 201 can be electrically connected. To achieve this, a body side connector is disposed in the image forming apparatus 201, and a unit side connector which can engage with the body side connector is disposed in the sheet storage apparatus 300. Using FIGS. 5 and 6, these body side connector and the unit side connector will be described.

Figure 5:
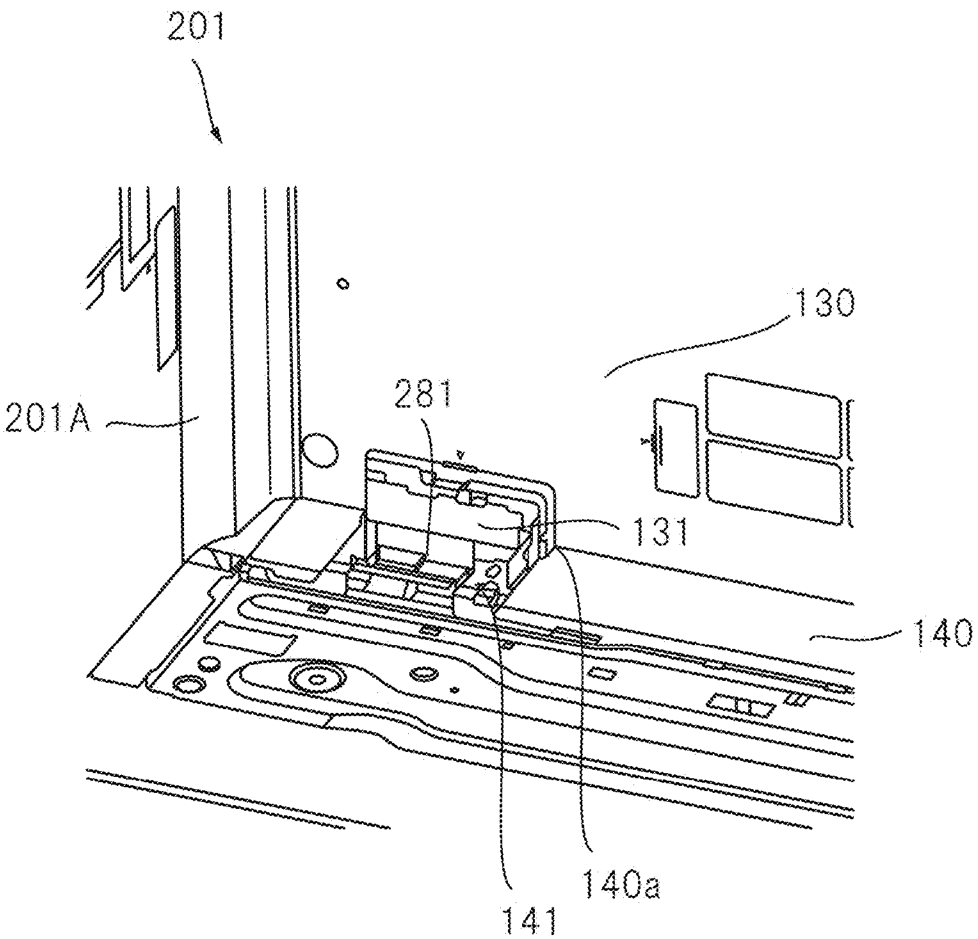
FIG. 5 is a schematic diagram illustrating a body side connector.

As illustrated in FIG. 5, in the back cover 130, serving as a second outer wall portion forming at least part of a second exterior surface, an opening window portion 131 which is a second opening with a lower end portion cut to open is formed. In particular, at an end portion of the back cover 130 on a side of the sheet storage apparatus 300 (external unit side), a recessed concave portion forming the opening window portion 131 from the sheet storage apparatus 300 toward the image forming apparatus 201 (i.e., upward) is disposed. On the other hand, in the bottom portion 140, serving as a first outer wall portion forming at least part of a first exterior surface, a bottom opening portion 141, serving as a first opening, is formed. This bottom opening portion 141 extends to an edge portion 140*a* at a lower end portion of the back cover 130, and opens continuously with the opening window portion 131 of the back cover 130. The first exterior surface is a surface facing an installation surface 400 on which the image forming apparatus 201 is installed. The sheet storage apparatus 300 is connectable at a position between the bottom portion 140 and the installation surface 400. The body side connector 281 is arranged inside of the casing 201A such that it is exposed through the bottom opening portion 141 in a state in which the detachable cover 500, described below, is not attached. In more particular, when viewed from a direction perpendicular to the bottom of the image forming apparatus 201 (i.e., from below), a connecting terminal of the body side connector 281 is exposed through the bottom opening portion 141.

In addition, the body side connector 281 is arranged inside of the casing 201A such that the worker can see the body side connector 281 visually by looking at the opening window portion 131 in a state in which the detachable cover 500, described below, is not attached. That is, when viewed from a direction perpendicular to a back surface of the image forming apparatus 201 (i.e., from the back), the body side connector 281 is exposed through the opening window portion 131. In this embodiment, the body side connector 281 is a component that is arranged inside of the casing 201A and is exposed from the opening window portion 131. As a variant example, a different component other than the body side connector 281 may be exposed from the opening window portion 131. For example, the body side connector 281 may be covered by such as a guide member for aligning the image forming apparatus 201 and the sheet storage apparatus 300. That is, even if the body side connector 281 is not visible, it is acceptable if the opening window portion 131 and the body side connector 281 are in a positional relationship of overlapping with each other when viewed from the direction perpendicular to the back surface of the image forming apparatus 201.

Figure 6:
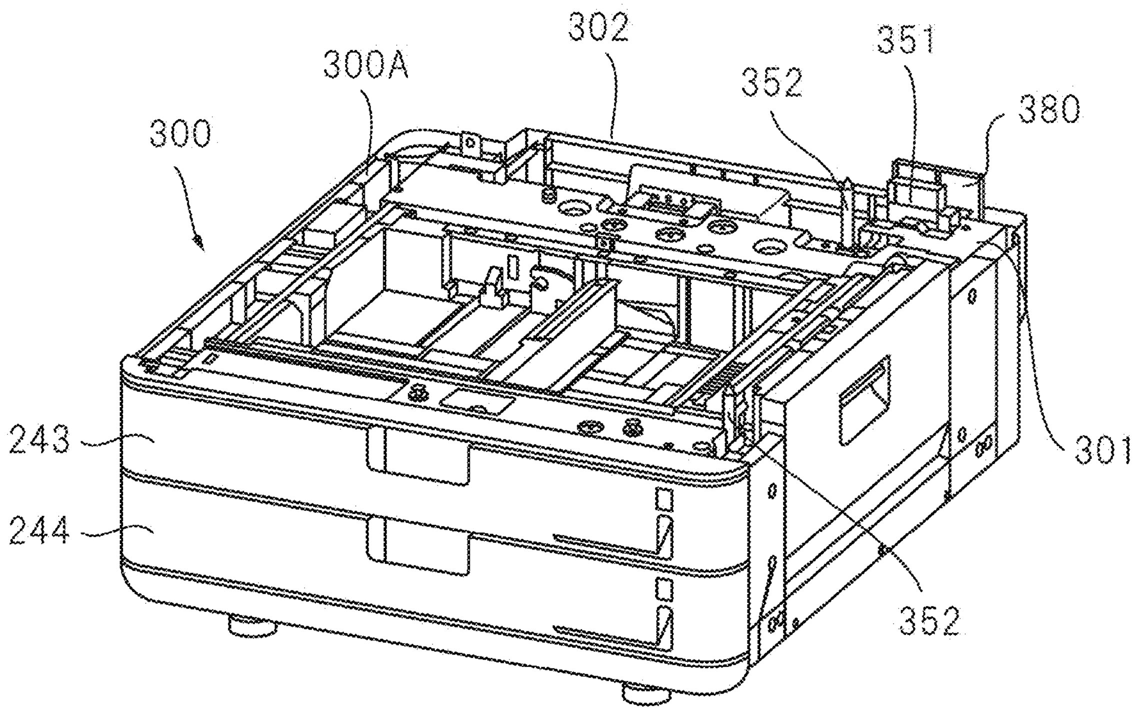
FIG. 6 is a perspective view illustrating a sheet storage apparatus.

As illustrated in FIG. 6, the sheet storage apparatus 300 mountable to the bottom portion 140 (refer to FIG. 3) of the image forming apparatus 201 includes a unit side casing 300A including a unit side back cover 302, serving as a unit side outer wall portion disposed in a direction intersecting with a surface that faces the bottom portion 140. The third and fourth cassettes 243 and 244 are disposed retractably toward the front side in the unit side casing 300A, serving as a second casing. The unit side connector 351 is disposed in this sheet storage apparatus 300. The unit side connector 351 is located at a position at which, when the sheet storage apparatus 300 is placed under a predetermined position of the image forming apparatus 201, the unit side connector 351 can be electrically connected with the body side connector 281 (refer to FIG. 5) of the image forming apparatus 201. Here, as an example, the unit side connector 351 is arranged at a position on the right of the back side of the sheet storage apparatus 300. In addition, the unit side connector 351 is disposed to partly project from a top plate 301, which faces the bottom portion 140 (refer to FIG. 5) of the image forming apparatus 201, toward the side of the casing 201A.

While illustrations are omitted, each of the body side connector 281 and the unit side connector 351 described above includes a plurality of electrical contact portions. The body side connector 281 includes a convex housing whose side surface portion that faces the unit side connector 351 when connected to the unit side connector 351 is formed in a convex shape. In the convex housing, the plurality of electrical contact portions are arranged in one direction. On the other hand, the unit side connector 351 includes a concave housing whose side surface portion that faces the body side connector 281 when connected to the body side connector 281 is formed in a concave shape. In the concave housing, the plurality of electrical contact portions are arranged in the same direction as the electrical contact portions of the body side connector 281.

The body side connector 281 and the unit side connector 351 are electrically connected by engaging the convex and concave housings with each other, so that the electrical contact portions each are brought into a contact state and are electrically connected. For example, the body side connector 281 is a male connector whose electrical contact portion is formed in a shape of a pin. On the other hand, the unit side connector 351 is a female connector. Tip portions of the electrical contact portions of the unit side connector 351 on a side of the body side connector 281 are bent to possess elasticity, and are formed to ensure easy contact with the electrical contact portions of the body side connector 281. Then, a power supply line for supplying the power and a signal line for transmitting and receiving the control signal to and from the image forming apparatus 201 with respect to the sheet storage apparatus 300 are interconnected to the unit side connector 351. An example of the body side connector 281 and the unit side connector 351 as described above includes, for example, a drawer connector.

To be noted, as illustrated in FIG. 6, in the sheet storage apparatus 300, positioning pins 352 for positioning the sheet storage apparatus 300 with respect to the casing 201A when mounting the sheet storage apparatus 300 to the casing 201A are disposed at two separate positions on a further front side and back side than a center in a front-back direction. These positioning pins 352 protrude from the top surface 301 toward the side of the image forming apparatus 201 (i.e., upper side). By positioning the sheet storage apparatus 300 with respect to the casing 201A by the positioning pins 352, the body side connector 281 and the unit side connector 351 described above are positioned to face each other.

Detachable Cover

As illustrated in FIG. 3, the detachable cover, serving as a cover member, is detachably disposed in the image forming apparatus 201. The detachable cover 500 is attached to the casing 201A using such as a screw and a snap fitting. The detachable cover 500 of this embodiment is attached to the image forming apparatus 201 when the sheet storage apparatus 300 is not mounted, and possesses both functions of a window cover to cover the opening window portion 131 of the back cover 130 and of a connector cover to cover the bottom opening portion 141 of the bottom portion 140. Hereinafter, with reference to FIG. 5, using FIGS. 7A to 10B, the detachable cover 500 of this embodiment will be described.

Figure 7A:
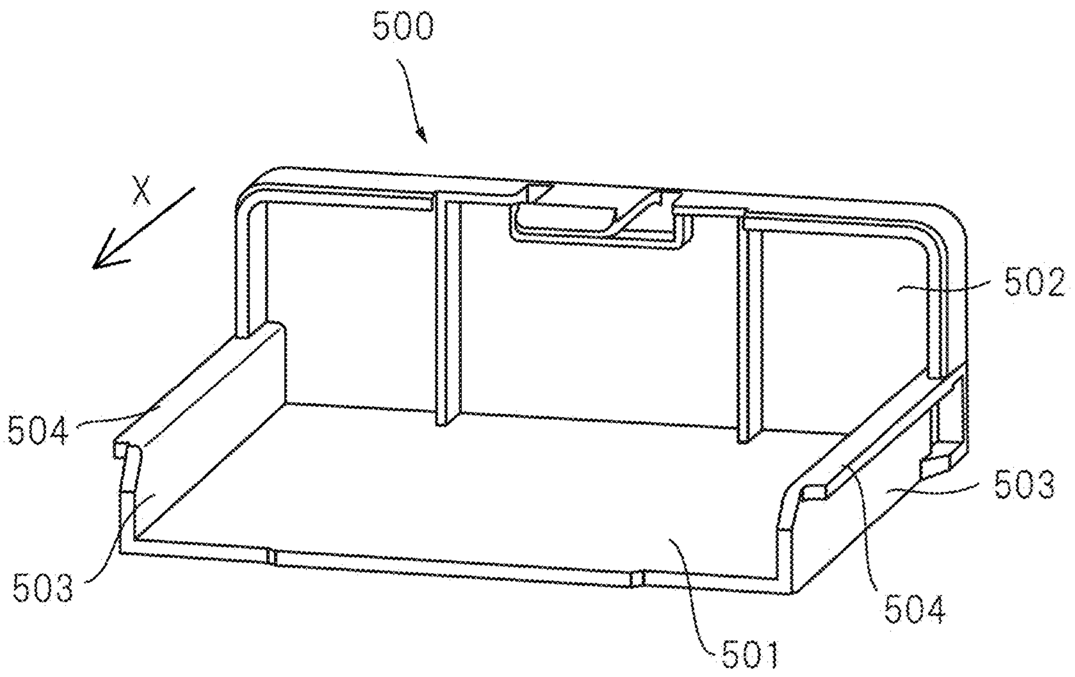
FIG. 7A is a perspective view illustrating a detachable cover when viewed from the inside.
Figure 7B:
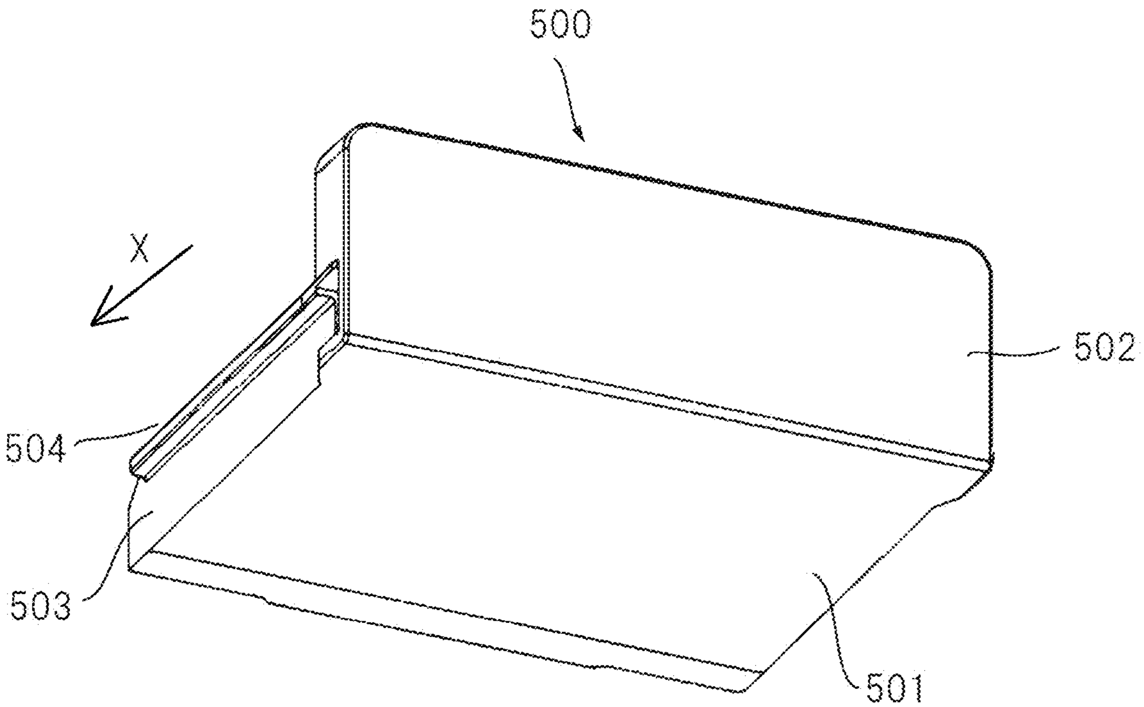
FIG. 7B is a perspective view illustrating the detachable cover when viewed from the outside.

As illustrated in FIGS. 7A and 7B, the detachable cover 500 includes a connector cover portion 501 and a window cover portion 502, and is a substantially L shaped member in which the connector and window cover portions 501 and 502 are formed integrally to intersect with each other. The connector cover portion 501, serving as a first cover portion, is disposed to extend in an attachment direction (arrow X direction) of the detachable cover 500. With respect to the attachment direction, the window cover portion 502, serving as a second cover portion, is disposed to extend from an upstream end of the connector cover portion 501 substantially perpendicularly toward the upper side. The connector cover portion 501 is formed in a size that covers the bottom opening portion 141 of the bottom portion 140, and the window cover portion 502 is formed in a size that covers the opening window portion 131 of the back cover 130.

In addition, the detachable cover 500 includes cover side guide walls 503 at both ends of the connector cover portion 501 with respect to a width direction intersecting with the attachment direction and the vertical direction. The cover side guide walls 503 extend upward in the vertical direction. Upstream ends of the cover side guide walls 503 in the attachment direction are connected to the window cover portion 502. Then, guide ribs 504 are formed on the cover side guide walls 503 to extend from an inner surface of the window cover portion 502 toward the attachment direction. The guide ribs 504 are formed by, for example, bending upper end portions of the cover side guide walls 503 outward in the vertical direction.

Figure 8:
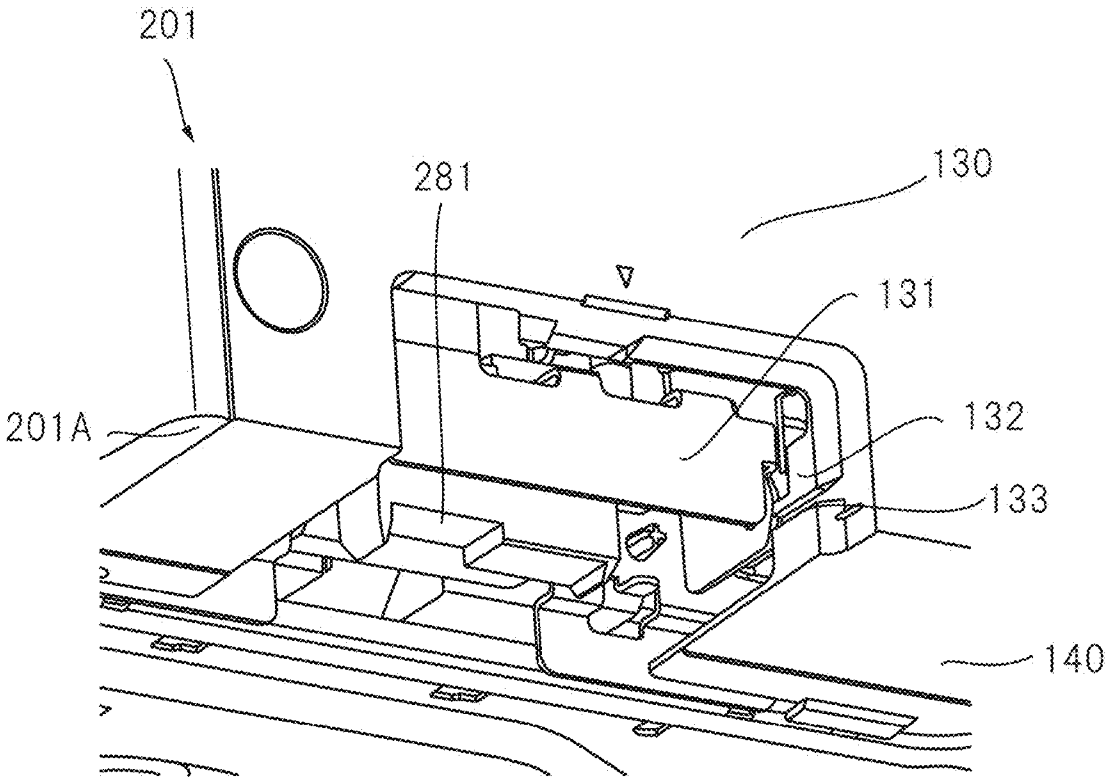
FIG. 8 is an enlarged view illustrating a casing side guide rail.

On the other hand, as illustrated in FIG. 8, in the bottom portion 140 of the casing 201A, casing side guide walls 132 are disposed at both end portions across the bottom opening portion 141 with respect to the width direction, and extend toward the upper side in the vertical direction. However, in FIG. 8, for the purpose of the illustration, only one of the casing side guide walls 132 is illustrated. In the attachment direction (arrow X direction) of the detachable cover 500, upstream ends of the casing side guide walls 132 are connected to the back cover 130. Then, in each of the casing side guide walls 132, a guide rail 133 is formed to extend from an inner surface of the back cover 130 toward the attachment direction. That is, the guide rail 133 is formed inside of the casing 201A and extending in the attachment direction.

By engaging the guide ribs 504 of the cover side guide wall 503 described above with the guide rails 133, the detachable cover 500 slides along the guide rails 133, and is attached to the casing 201A. These guide ribs 504 and guide rails 133 form a guide portion that slidably guides the detachable cover 500 in the attachment direction intersecting with the back cover 130 while the detachable cover 500 is being attached to the casing 201A.

Figure 9:
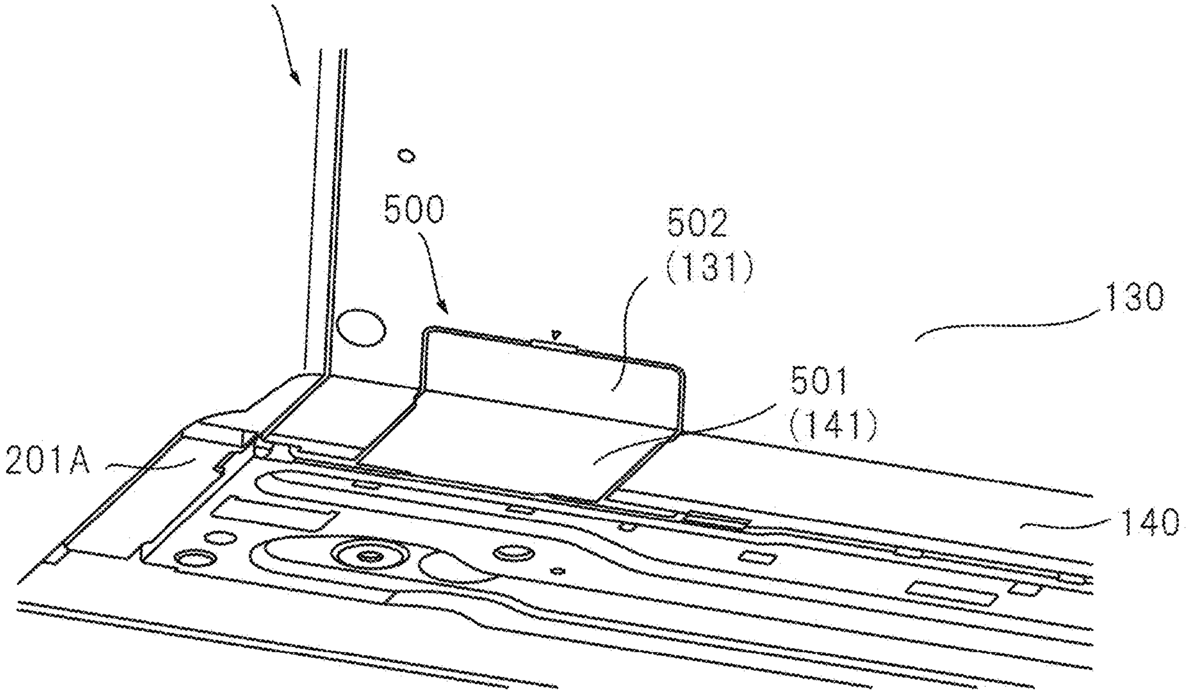
FIG. 9 is a schematic diagram illustrating the detachable cover after attachment.

In a state in which the detachable cover 500 is attached to the casing 201A, as illustrated in FIG. 9, the bottom opening portion 141 of the bottom portion 140 is covered by the connector cover portion 501 of the detachable cover 500. As described above, since the bottom opening portion 141 is covered by the connector cover portion 501, the body side connector 281 disposed in the image forming apparatus 201 is not exposed from the bottom opening portion 141, so that the body side connector 281 is protected from being touched by the worker. To be noted, in FIG. 9, to enhance understanding of the description, the illustration of the body side connector 281 is omitted.

In addition, in the state in which the detachable cover 500 is attached to the casing 201A, the opening window portion 131 of the back cover 130 is covered by the window cover portion 502 of the detachable cover 500. As described above, since the opening window portion 131 is covered by the window cover portion 502, such as external dust does not enter the casing 201A from the opening window portion 131. Therefore, the occurrence of electrical contact malfunctions due to the adhesion of such as the dust to the body side connector 281 is suppressed.

Figure 10A:
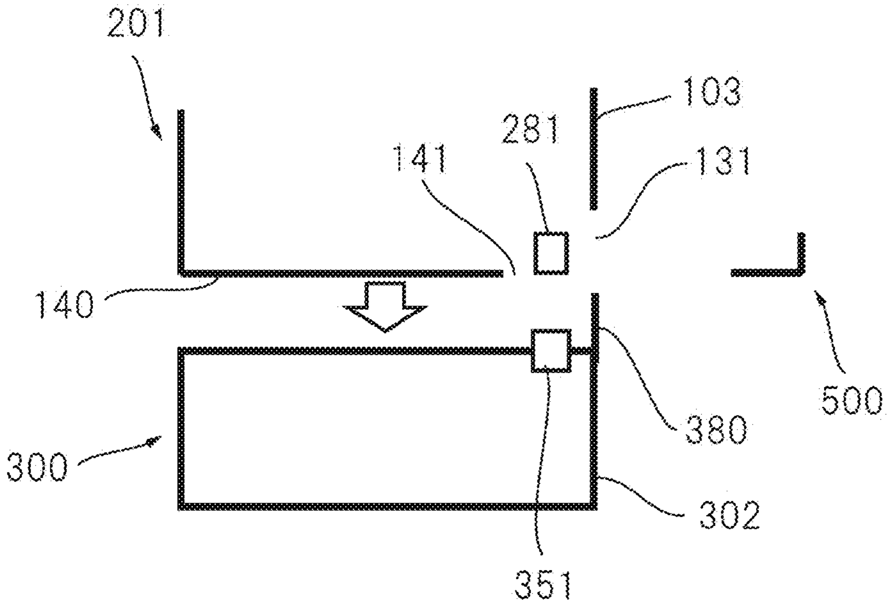
FIG. 10A is a schematic diagram illustrating a state at a time of mounting the sheet storage apparatus.

In this embodiment, when mounting the sheet storage apparatus 300 to the image forming apparatus 201, the detachable cover 500 is detached from the image forming apparatus 201. By detaching the detachable cover 500, as illustrated in FIG. 10A, the bottom opening portion 141 of the bottom portion 140 is opened, and the body side connector 281 is exposed from the bottom opening portion 141. By exposing the body side connector 281 from the bottom opening portion 141, it becomes possible to engage and electrically connect the body side connector 281 with the unit side connector 351. In addition, by detaching the detachable cover 500, the opening window portion 131 of the back cover 130 is opened. By opening the opening window portion 131, the worker can reliably engage the body side connector 281 and the unit side connector 351 by viewing their positions from the opening window portion 131.

Figure 10B:
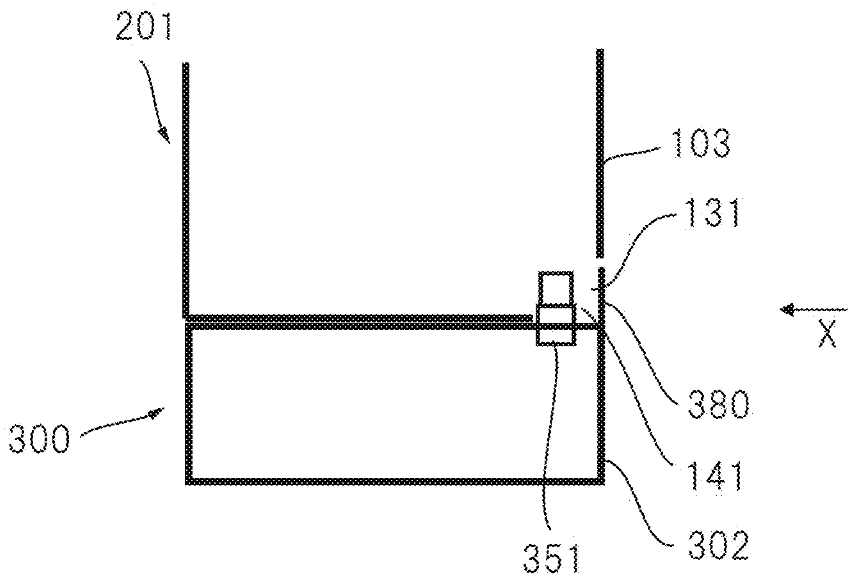
FIG. 10B is a schematic diagram illustrating a state after mounting the sheet storage apparatus.

However, if the opening window portion 131 remains to be opened in the state in which the sheet storage apparatus 300 is mounted to the image forming apparatus 201, there is a risk that such as the dust may enter from the opening window portion 131. Therefore, as illustrated in FIGS. 10A and 10B, a projection portion 380 projecting from an end portion of the unit side back cover 302 on the side of the image forming apparatus 201 toward a side of the bottom portion 140 is disposed in the sheet storage apparatus 300. The projection portion 380 projects from the end portion of the unit side back cover 302 to cover at least part of the unit side connector 351 when viewed from the outside of the unit side back cover 302 in a direction perpendicular to a projecting direction of the unit side connector 351.

As illustrated in FIG. 10B, in the state in which the sheet storage apparatus 300 is mounted to the image forming apparatus 201, the projection portion 380 covers the opening window portion 131 of the back cover 130. To achieve this, at the end portion of the unit side back cover 302 on the side of image forming apparatus 201 (image forming apparatus side), the projection portion 380 projecting from the sheet storage apparatus 300 toward the image forming apparatus 201 is disposed to engage with the opening window portion 131. The projection portion 380 is formed substantially in the same size as the opening window portion 131. Thereby, as illustrated in FIG. 10B or 2, since the opening window portion 131 is closed by the projection portion 380, it is possible to suppress the intrusion of such as the dust from the opening window portion 131.

As described above, in this embodiment, by attaching the detachable cover 500 to the standalone image forming apparatus 201, the bottom opening portion 141 of the bottom portion 140 is closed by the connector cover portion 501 of the detachable cover 500. Since the window cover portion 502 is formed integrally with the connector cover portion 501 in the detachable cover 500, the opening window portion 131 of the back cover 130 is closed by the window cover portion 502 of the detachable cover 500. In addition, when mounting the sheet storage apparatus 300 to the image forming apparatus 201, the worker can open the bottom opening portion 141 and the opening window portion 131 only by detaching the detachable cover 500 from the image forming apparatus 201. That is, since the worker can close and open the bottom opening portion 141 and the opening window portion 131 only by attaching and detaching the detachable cover 500, it does not take time. As described above, according to this embodiment, it is possible to improve the workability of mounting and removing the sheet storage apparatus 300 with respect to the image forming apparatus 201 by the worker.

In addition, in the case of this embodiment, in the standalone image forming apparatus 201, only by simply observing from the outside, the worker can easily understand that the detachable cover is attached to close the bottom opening portion 141 and the opening window portion 131. As described above, if the detachable cover 500 is attached, the bottom opening portion 141 and the opening window portion 131 are closed by the detachable cover 500. Therefore, in a case where the sheet storage apparatus 300 is removed from the image forming apparatus 201, the worker can determine at first glance whether or not the detachable cover 500 is attached to the image forming apparatus 201. As described above, since it is possible to prevent the worker from neglecting to attach the detachable cover 500, it is possible to reduce a risk of the worker accidentally touching the body side connector 281 exposed from the bottom opening portion 141 and receiving an electric shock.

In addition, since, as described above, the projection portion 380 is disposed in the sheet storage apparatus 300, the projection portion 380 closes the opening window portion 131 of the back cover 130 in the state in which the sheet storage apparatus is mounted to the image forming apparatus 201. This prevents the dust and the like from entering through the opening window portion 131, and, thereby, it is possible to reduce the likelihood of electrical contact malfunctions in the case where the sheet storage apparatus 300 is mounted to the image forming apparatus 201.

According to this disclosure, it is possible to improve the workability of mounting and removing the external unit to the image forming apparatus by the worker.

Other Embodiments

To be noted, while, in the embodiment described above, to close the opening window portion 131 of the back cover 130 in the state in which the sheet storage apparatus 300 is mounted to the image forming apparatus 201, the projection portion 380 is disposed in the unit side back cover 302 of the sheet storage apparatus 300, it is not limited to this. For example, without disposing the projection portion 380 in the unit side back cover 302, it is acceptable to configure such that, after the sheet storage apparatus 300 is mounted to the image forming apparatus 201, the worker closes only the opening window portion 131 with a detachable cover by reattaching the detachable cover that has been detached from the image forming apparatus 201. Using FIGS. 11 and 12, the detachable cover 500A that can achieve this will be described. To be noted, in the following, descriptions of configurations similar to the embodiment described above will be simplified or omitted by putting the same reference characters on drawings.

Figure 11:
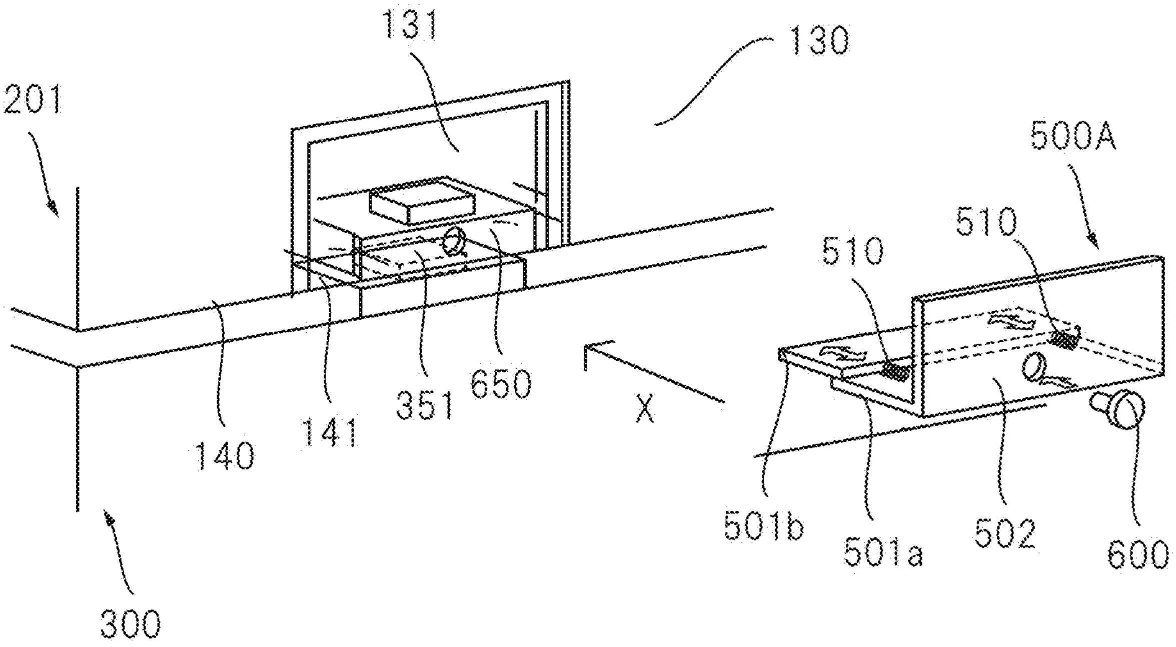
FIG. 11 is a perspective view illustrating a detachable cover of the other embodiment.

As illustrated in FIG. 11, the detachable cover 500A includes a connector cover portion (501*a* and 501*b*) and a window cover portion 502, and is a substantially L shaped member in which the connector cover portion (501*a* and 501*b*) is arranged to intersect with the widow cover portion 502. The connector cover portion (501*a* and 501*b*) extends in an attachment direction (arrow X direction) of the detachable cover 500A. However, different from the detachable cover 500 (refer to FIG. 7A) described above, the connector cover portion (501*a* and 501*b*) includes a lower stage cover portion 501*a*, serving as a fixed portion fixed to the window cover portion 502, and an upper stage cover portion 502*b*, serving as a moving portion that can slide with respect to the lower stage cover portion 501*a*.

By a coil spring 510, serving as an urging member with a first end supported by the window cover portion 502, the upper stage cover portion 501*b* is urged toward a direction of closing the bottom opening portion 141 of the bottom portion 140. In other words, the upper stage cover portion 501*b* is disposed to allow opening of the bottom opening portion 141 of the bottom portion 140 while resisting an urging force of the coil spring 510. In a case where the detachable cover 500A is attached to the image forming apparatus 201 to which the sheet storage apparatus 300 is not mounted, the upper stage cover portion 501*b* is urged by the coil spring 510, and closes the bottom opening portion 141 of the bottom portion 140 together with the lower stage cover portion 501*a*. To be noted, the window cover portion 502 closes the opening window portion 131 of the back cover 130.

Figure 12:
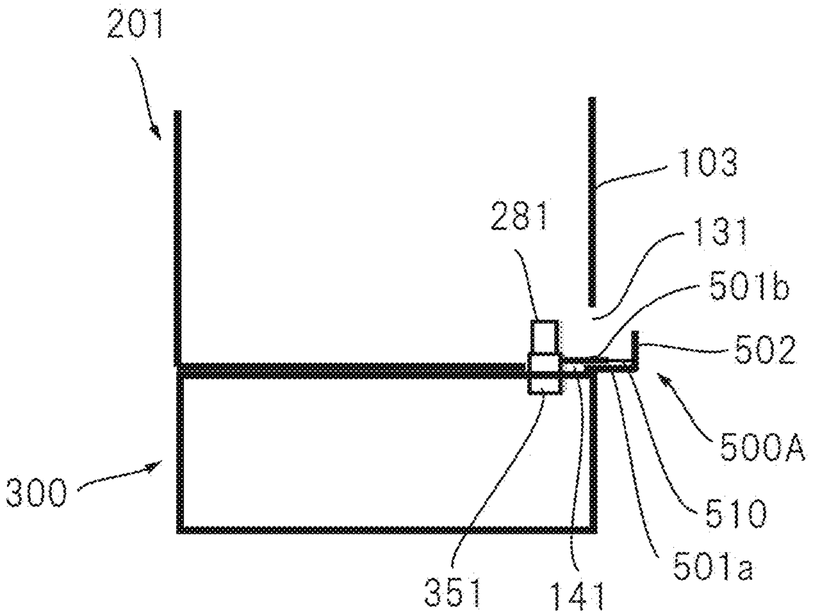
FIG. 12 is a schematic diagram for explaining an opening and closing operation of the detachable cover illustrated in FIG. 11.

As illustrated in FIG. 12, in a case where the worker attaches the detachable cover 500A in the state in which the sheet storage apparatus 300 is mounted to the image forming apparatus 201, a tip portion of the upper stage cover portion 501*b* comes into contact with the unit side connector 351 of the sheet storage apparatus 300, and the movement of the upper stage cover portion 501*b* in the attachment direction (arrow X direction) is restricted. Since, in contrast, the movement of the lower stage cover portion 501*a* in the attachment direction is not restricted, the upper and lower stage cover portions 501*b* and 501*a* move relative to each other. As described above, the upper stage cover portion 501*b* slides on the lower stage cover portion 501*a* toward the window cover portion 502 by resisting the urging force of the coil spring 510. By sliding the upper stage cover portion 501*b*, the detachable cover 500A is attached while maintaining the bottom opening portion 141 of the bottom portion 140 in a state of being opened. To be noted, while, here, by bringing the upper stage cover portion 501*b* into contact with the unit side connector 351, the movement of the upper stage cover portion 501*b* in the attachment direction is restricted, it is not limited to this, and, for example, a regulation member that restricts the movement of the upper stage cover portion 501*b* in the attachment direction may be disposed in the sheet storage apparatus 300.

Thereafter, as illustrated in FIG. 11, the detachable cover 500A is secured to an attachment portion 650 disposed in the casing 201A with such as a screw 600. At this time, the window cover portion 502 closes the opening window portion 131 of the back cover 130. As described above, when the detachable cover 500A is reattached in the state in which the sheet storage apparatus 300 is mounted to the image forming apparatus 201, the opening widow portion 131 of the back cover 130 is closed in a state in which the bottom opening portion 141 of the bottom portion 140 is opened.

To be noted, while, in the embodiment described above, the sheet storage apparatus 300 is mounted beneath the image forming apparatus 201 as the retrofit optional apparatus, it is not limited to this. For example, in cases where, as an optional apparatus, a different type of a sheet storing apparatus is mounted to a surface on the right of the image forming apparatus 201, and a finisher apparatus performing punch processing to create holes in the sheet P and staple processing to bind and staple a plurality of sheets of the sheet P is mounted to a surface on the left of the image forming apparatus 201, and the like, this disclosure can be also applied.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-172272, filed Oct. 3, 2023 which is hereby incorporated by reference herein in its entirety.

What is claimed is:

1. An image forming apparatus configured to form an image on a recording material and configured to be connectable with an external unit, the image forming apparatus comprising:

a casing including a first outer wall portion configured to form at least part of a first exterior surface facing an installation surface on which the image forming apparatus is installed, and a second outer wall portion configured to form at least part of a second exterior surface intersecting with the first exterior surface, the external unit being connectable at a position between the first exterior surface and the installation surface;

a connector provided inside of the casing and configured to be electrically connectable with the external unit; and a cover member attachable to and detachable from the casing, wherein the first outer wall portion includes a first opening configured to expose a connection terminal of the connector, wherein the second outer wall portion includes a second opening configured to expose a component provided inside of the casing, and wherein the cover member includes a first cover portion configured to cover the first opening in a state where the cover member is attached to the casing, and a second cover portion formed integrally with the first cover portion and configured to cover the second opening in the state where the cover member is attached to the casing.

2. The image forming apparatus according to claim 1, further comprising:

a guide portion configured to guide the cover member to slide in an attachment direction along the first exterior surface when the cover member is being attached to the casing or detached from the casing.

3. The image forming apparatus according to claim 2, wherein the guide portion includes a guide rail formed inside of the casing and extending in the attachment direction, and a guide rib formed on the cover member and configured to engage with the guide rail.

4. The image forming apparatus according to claim 1, wherein the connector is exposed from the second opening.

5. The image forming apparatus according to claim 1, wherein a power supplied to the external unit is supplied to the connection terminal of the connector.

6. The image forming apparatus according to claim 1, wherein the first cover portion includes a fixed portion fixed to the second cover portion, a moving portion configured to slide with respect to the fixed portion, and an urging member configured to urge the moving portion with respect to the second cover portion in an attachment direction intersecting with the second outer wall portion, and wherein, in a case where the cover member is attached to the casing, the moving portion is configured to open the first opening while resisting an urging force of the urging member.

7. The image forming apparatus according to claim 1, wherein the second exterior surface is a back surface of the casing.

8. An image forming system comprising:

an image forming apparatus configured to form an image on a recording material; and an external unit connected to the image forming apparatus, wherein the image forming apparatus includes a first casing including a first outer wall portion configured to form at least a part of a facing surface facing the external unit, and a second outer wall portion configured to form at least a first part of an exterior surface intersecting with the facing surface, the external unit being provided at a position between the first exterior surface and an installation surface where the image forming system is installed, and a body side connector provided inside of the first casing, wherein the external unit includes a second casing including a unit side outer wall portion configured to form a second part of the exterior surface, the second part being different from the first part, and a unit side connector electrically connected with the body side connector, wherein an external-unit-side edge of the second outer wall portion includes a concave portion where the edge of the second outer wall portion is recessed toward the image forming apparatus from the external unit, wherein an image-forming-apparatus-side edge of the unit side outer wall portion includes a projection portion where the edge of the unit side outer wall portion projects toward the image forming apparatus from the external unit, the projection portion engaging with the concave portion, and wherein, when viewed in a direction perpendicular to the second outer wall portion, the projection portion overlaps at least partially with the body side connector.

9. The image forming system according to claim 8, wherein the external unit is disposed below the image forming apparatus in a vertical direction.

10. The image forming system according to claim 8, wherein the external unit includes an accommodating portion configured to accommodate the recording material to be supplied to the image forming apparatus.

11. The image forming system according to claim 8, wherein the image forming apparatus includes a guide portion configured to guide a cover member, which is attachable to and detachable from the first casing, to slide in an attachment direction along the facing surface when the cover member is attached to or detached from the first casing in a state where the image forming apparatus is detached from the external unit.

12. The image forming system according to claim 11, wherein the guide portion includes a guide rail formed inside of the first casing, extending in the attachment direction, and engaging with a guide rib formed on the cover member.

13. An image forming system comprising:

an image forming apparatus configured to form an image on a recording material; and an external unit connected to the image forming apparatus, wherein the image forming apparatus includes a first casing that includes a first outer wall portion configured to form at least a part of a first exterior surface facing the external unit, and a second outer wall portion configured to form at least a first part of a second exterior surface intersecting with the first exterior surface, the external unit being provided at a position between the first exterior surface and an installation surface where the image forming system is installed, a body side connector provided inside of the first casing, and a cover member configured detachably attached to the first casing, wherein the first outer wall portion includes a first opening configured to expose a connection terminal of the body side connector, wherein the second outer wall portion includes a second opening configured to expose a component provided inside of the first casing, wherein the cover member includes a first cover portion configured to cover the first opening in a state where the cover member is attached to the first casing, and a second cover portion formed integrally with the first cover portion and configured to cover the second opening in the state where the cover member is attached to the first casing, wherein the external unit includes a second casing including a unit side outer wall portion configured to form a second part of the second exterior surface, the second part being different from the first part, and a unit side connector electrically connected with the body side connector, wherein the first cover portion includes a fixed portion fixed to the second cover portion, a moving portion configured to slide with respect to the fixed portion, and an urging member configured to urge the moving portion with respect to the second cover portion in an attachment direction intersecting with the second outer wall portion, and wherein, in a case where the cover member is attached to the first casing, the moving portion is configured to open the first opening while resisting an urging force of the urging member.

14. The image forming system according to claim 13, wherein, in the case where the cover member is attached to the first casing, by coming into contact with the unit side connector, the moving portion is configured to open the first opening while resisting the urging force of the urging member.

15. An external unit configured to be connected on an outer wall portion of a casing included in an image forming apparatus which forms an image on a recording material, the external unit comprising:

a unit side casing including a unit side outer wall portion configured to form at least a part of an exterior surface intersecting with a facing surface to face the outer wall portion of the casing of the image forming apparatus; and a unit side connector projecting toward a side of the image forming apparatus further than the facing surface and configured to be electrically connected with the image forming apparatus, wherein the unit side outer wall portion includes a protruding portion formed by a part of an image-forming-apparatus-side edge of the unit side outer wall portion projecting toward the image forming apparatus from other part of the image-forming-apparatus-side edge, and wherein the protruding portion overlaps with the unit side connector when viewed from an outside of the unit side outer wall portion in a direction perpendicular to a projecting direction of the unit side connector.

16. The external unit according to claim 15, wherein the outer wall portion of the casing of the image forming apparatus includes a first outer wall portion configured to form at least part of a first exterior surface, and wherein, in a state where the external unit is connected to the first outer wall portion of the image forming apparatus, the projection portion is configured to cover an opening portion formed in a second outer wall portion configured to form at least part of a second exterior surface intersecting with the first exterior surface in the image forming apparatus.

17. The external unit according to claim 15, wherein the external unit is to be connected below the image forming apparatus in a vertical direction.

18. The external unit according to claim 15, further comprising:

an accommodating portion configured to accommodate the recording material supplied to the image forming apparatus.

* * * * *